(12) United States Patent
Bauman et al.

(10) Patent No.: US 10,975,917 B2
(45) Date of Patent: Apr. 13, 2021

(54) UNITIZED WEDGE CLUTCH

(71) Applicant: Schaeffler Technologies AG & Co. KG, Herzogenaurzh (DE)

(72) Inventors: Jeremiah Bauman, Orrville, OH (US); Michael Hodge, Creston, OH (US); James Copeland, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 71 days.

(21) Appl. No.: 16/273,315

(22) Filed: Feb. 12, 2019

(65) Prior Publication Data
US 2019/0257367 A1    Aug. 22, 2019

Related U.S. Application Data

(60) Provisional application No. 62/631,996, filed on Feb. 19, 2018.

(51) Int. Cl.
| | | |
|---|---|---|
| *F16D 13/16* | (2006.01) | |
| *F16D 13/58* | (2006.01) | |
| *F16D 13/06* | (2006.01) | |
| *F16D 15/00* | (2006.01) | |
| *F16D 41/063* | (2006.01) | |

(52) U.S. Cl.
CPC .............. *F16D 13/16* (2013.01); *F16D 13/06* (2013.01); *F16D 13/58* (2013.01); *F16D 15/00* (2013.01); *F16D 41/063* (2013.01)

(58) Field of Classification Search
CPC .......... F16D 13/16; F16D 13/58; F16D 13/06; F16D 41/063; F16D 41/06; F16D 15/00
See application file for complete search history.

(56) References Cited

U.S. PATENT DOCUMENTS

| | | | |
|---|---|---|---|
| 9,470,275 B2 | 10/2016 | Lee et al. | |
| 2009/0159390 A1 | 6/2009 | Davis | |
| 2014/0231208 A1 | 8/2014 | Lee et al. | |
| 2016/0084326 A1 | 3/2016 | Ramsey | |
| 2016/0238090 A1* | 8/2016 | Spencer | F16D 15/00 |
| 2017/0219025 A1 | 8/2017 | Ohr et al. | |
| 2018/0038423 A1 | 2/2018 | Ohr et al. | |
| 2018/0180107 A1 | 6/2018 | Ince et al. | |
| 2018/0180109 A1 | 6/2018 | Ince et al. | |

FOREIGN PATENT DOCUMENTS

| | | |
|---|---|---|
| JP | 06137345 A | 5/1994 |
| WO | 2017065776 A1 | 4/2017 |

\* cited by examiner

*Primary Examiner* — Charles A Fox
*Assistant Examiner* — Lori Wu
(74) *Attorney, Agent, or Firm* — Reid A. Baldwin

(57) ABSTRACT

A unitized wedge clutch includes a first race, a second race, a wedge segment, and a first side plate. The first race has a circumferential groove with a first angled surface and a second angled surface. The second race has a first ramp surface extending radially outward in a circumferential direction. The wedge segment is arranged in a radial space between the first race and the second race. The wedge segment has a third angled surface aligned with the first angled surface and a fourth angled surface aligned with the second angled surface, a second ramp surface aligned with the first ramp surface, and a first aperture. The first side plate has a first protrusion extending through the first aperture. The unitized wedge clutch may have a plurality of wedge segments arranged circumferentially in a radial space between the first race and the second race.

17 Claims, 5 Drawing Sheets

UNITIZED WEDGE CLUTCH

CROSS-REFERENCE TO RELATED APPLICATIONS

This application claims the benefit under 35 U.S.C. § 119(e) of U.S. Provisional Patent Application No. 62/631,996, filed Feb. 19, 2018, which application is incorporated in its entirety herein by reference.

TECHNICAL FIELD

The present disclosure relates generally to a wedge clutch, and more specifically to a unitized wedge clutch.

BACKGROUND

Wedge clutches are known. One example is shown and described in commonly-assigned U.S. Pat. No. 9,470,275 to Lee et al. titled WEDGE CLUTCH WITH A SEGMENTED WEDGE ELEMENT AND CHAMFERED ENGAGEMENT SURFACES, hereby incorporated by reference as if set forth fully herein.

SUMMARY

According to at least one embodiment, a unitized wedge clutch includes a first race, a second race, a wedge segment, and a first side plate. The first race has a circumferential groove with a first angled surface and a second angled surface. The second race has a first ramp surface extending radially outward in a circumferential direction. The wedge segment is arranged in a radial space between the first race and the second race. The wedge segment has a third angled surface aligned with the first angled surface and a fourth angled surface aligned with the second angled surface, a second ramp surface aligned with the first ramp surface, and a first aperture. The first side plate has a first protrusion extending through the first aperture. The unitized wedge clutch may have a plurality of wedge segments arranged circumferentially in a radial space between the first race and the second race.

The second race may include a third annular surface and a fourth annular surface, axially offset from the third annular surface by a first distance. The first side plate may include a fifth annular surface, axially aligned with the third annular surface, and a sixth annular surface, axially offset from the fifth annular surface by a second distance, less than the first distance. The second race may include a staked portion extending from the fourth annular surface to cover at least a portion of the sixth annular surface. The first angled surface and the second angled surface may be arranged to axially retain the wedge segment relative to the first race, and the first side plate is arranged to axially retain the second race relative to the wedge segment.

The second race may include a circumferential recess with a first depth, and the first side plate may have a first width less than the first depth. The first side plate may be formed from plastic and the first protrusion may be snap-fit into the first aperture. The first side plate may include a seventh annular surface, the first protrusion may include a bent tab with a first portion forming a planar surface parallel to the seventh annular surface, and the wedge segment may be axially retained between the seventh annular surface and the planar surface. The first protrusion may include a second portion extending axially from the seventh annular surface to the first portion. The wedge segment may have a width and the planar surface may be axially offset from the seventh annular surface by a third distance, greater than the width. The first aperture may be larger than the first protrusion such that the wedge segment is partially displaceable relative to the first side plate in a circumferential direction.

The unitized wedge clutch may include a plurality of wedge segments. The first side plate may include a plurality of first protrusions, each of the plurality of wedge segments may include an aperture, and each aperture may have a respective one of the plurality of first protrusions passing therethrough. The first race may be a radially outer race and the second race may be a radially inner race. The first race may include a serrated outer surface for press-fitting. The first side plate may include a second aperture circumferentially offset from the first protrusion.

The unitized wedge clutch may include a second side plate. The first side plate may be disposed on a first axial side of the wedge segment while the second side plate is disposed on a second axial side of the wedge segment, opposite the first axial side. The first protrusion may be connected to the second side plate to fix the first side plate to the second side plate. The wedge segment may have a width, the first side plate and the second side plate may be disposed axially apart by a fourth distance, greater than the width. The second side plate may include a second protrusion, the second protrusion may be installed inside of the first protrusion to connect the first protrusion to the second side plate, and the aperture may be larger than the first protrusion such that the wedge segment is partially displaceable relative to the first side plate and the second side plate in a circumferential direction. The second race may include a first circumferential recess and a second circumferential recess, the first side plate may be installed in the first circumferential recess, and the second side plate may be installed in the second circumferential recess. The first angled surface and the second angled surface may be arranged to axially retain the wedge segment relative to the first race, and the first side plate and the second side plate may be arranged to axially retain the second race relative to the wedge segment.

A method of assembling a unitized wedge clutch includes positioning a plurality of wedge segments relative to a first race, inserting a first side plate, and attaching a second race to the first side plate. Angled surfaces of the wedge segment engage a groove in the first race to axially retain the wedge segments relative to the first race. Protrusions of the first side plate extend through respective apertures of each of the wedge segments. The protrusions may snap fit into the respective apertures axially retaining the wedge segments relative to the first side plate. Ramped surfaces of the second race align with respective ramped surfaces of the wedge segments. The first side plate may be staked to the second race. The method may also include positioning a second side plate on an opposite side of the wedge segments and attaching the second side plate to the protrusions of the first side plate.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
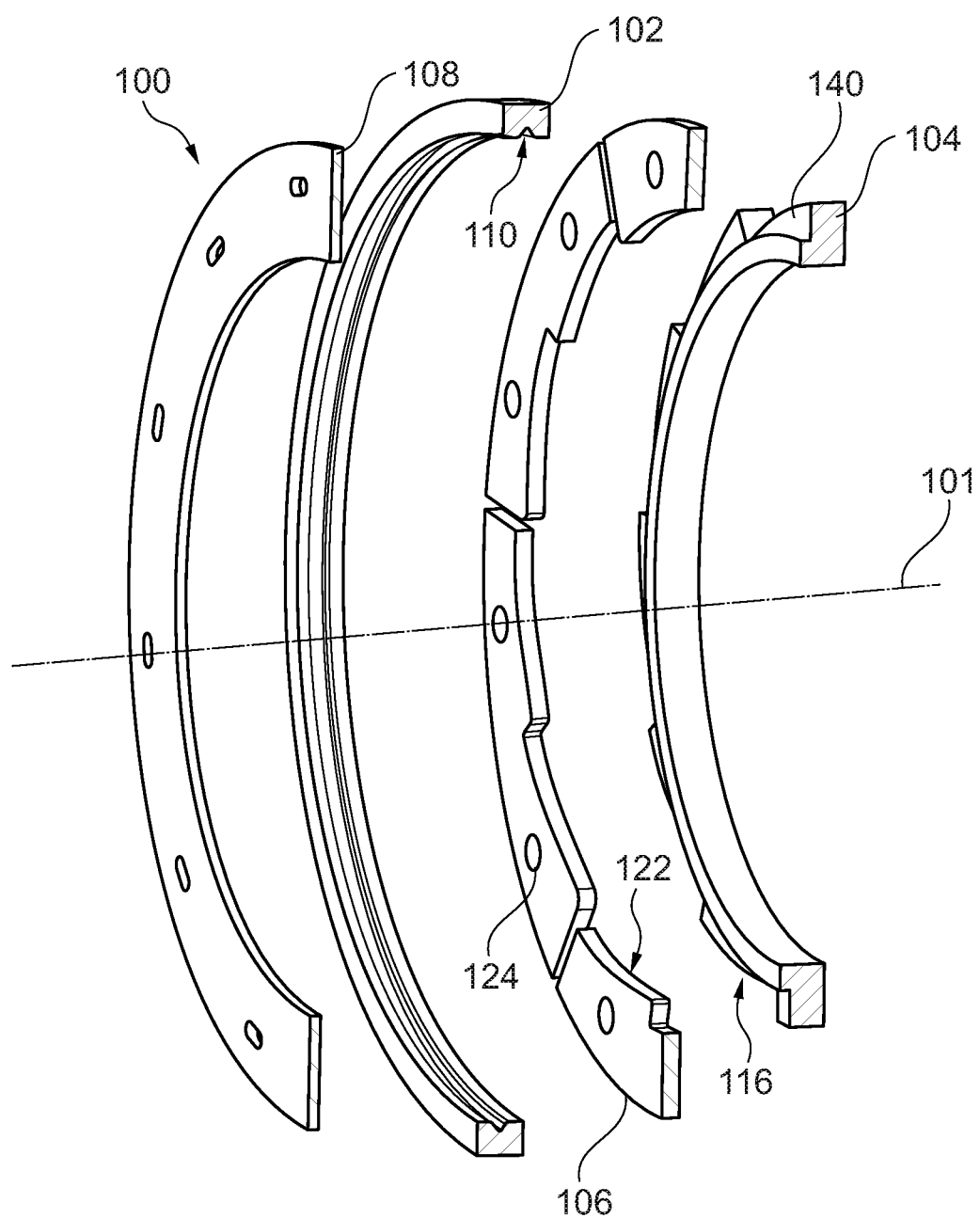
FIG. 1 illustrates a partial perspective exploded view of a unitized wedge clutch according to an example aspect of the present disclosure.
Figure 2:
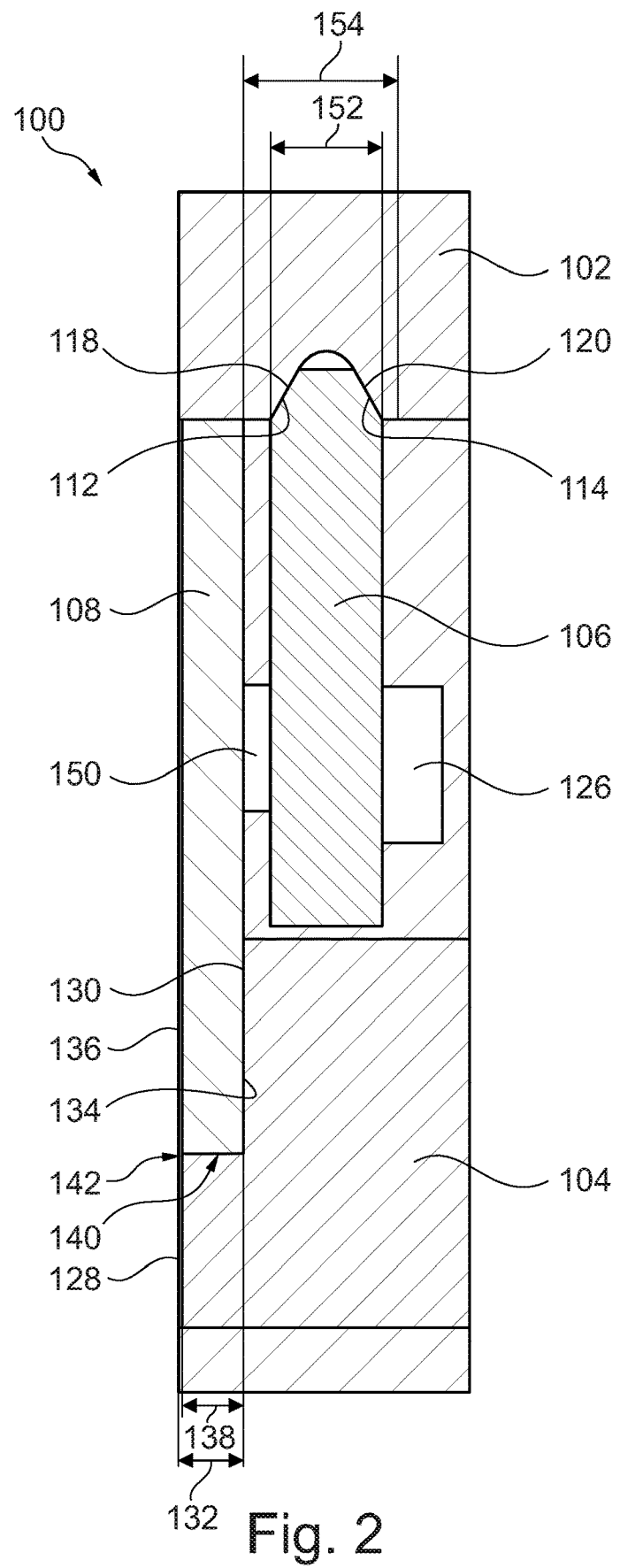
FIG. 2 illustrates a cross-sectional view of the unitized wedge clutch of FIG. 1.
Figure 3:
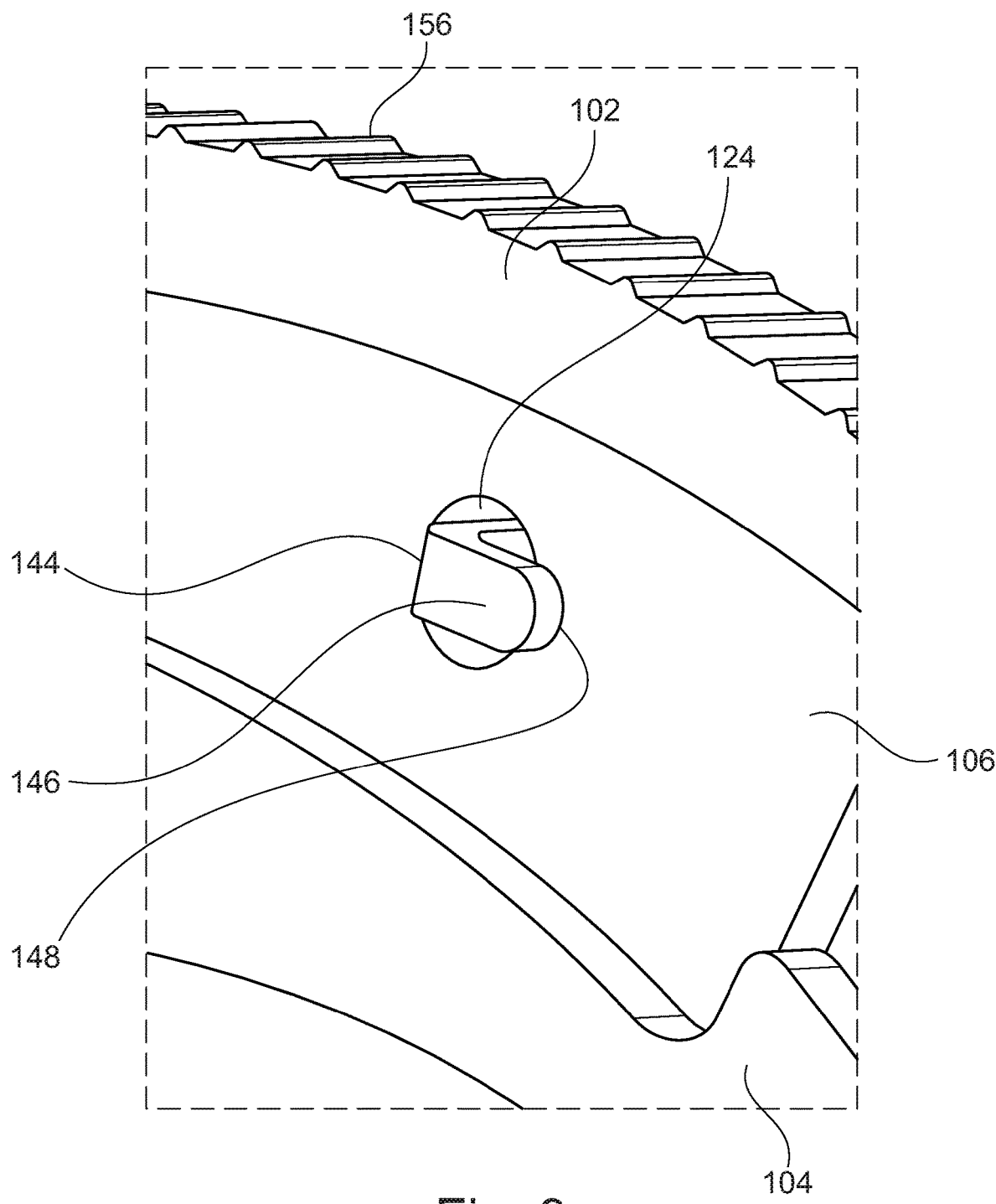
FIG. 3 illustrates a detail perspective view of the unitized wedge clutch of FIG. 1.

The following description is made with reference to FIGS. 1-3. FIG. 1 illustrates a partial perspective exploded view of unitized wedge clutch 100 according to an example aspect of the present disclosure. FIG. 2 illustrates a cross-sectional view of the unitized wedge clutch of FIG. 1. FIG. 3 illustrates a detail perspective view of the unitized wedge clutch of FIG. 1. Unitized wedge clutch 100 includes central axis 101, first race 102, second race 104, wedge segment 106 and side plate 108. Race 102 includes circumferential groove 110 with angled surface 112 and angled surface 114. Race 104 includes ramp surface 116 extending radially outward in a circumferential direction. Wedge segment 106 is arranged in a radial space between races 102 and 104. The wedge segment includes angled surface 118 aligned with angled surface 112 and angled surface 120 aligned with angled surface 114. The wedge segment also includes ramp surface 122 aligned with ramp surface 116. Wedge segment 106 includes aperture 124 and side plate 108 includes protrusion 126 extending through the aperture. In an example embodiment, unitized wedge clutch 100 includes a plurality of wedge segments 106 arranged circumferentially in a radial space between race 102 and race 104.

Race 104 includes annular surface 128 and annular surface 130, axially offset from annular surface 128 by distance 132. Side plate 108 includes annular surface 134 axially aligned with annular surface 130, and annular surface 136, axially offset from annular surface 134 by distance 138. Distance 138 is less than distance 132. Otherwise stated, race 104 includes circumferential recess 140 with depth 132 and side plate has a width 138 less than depth 132. Race 104 includes staked portion 142 extending from annular surface 130 to cover at least a portion of annular surface 136. By staking, we mean that material from the race is displaced and a portion of that material is displaced radially to extend over the surface. As best shown in FIG. 2, angled surfaces 112 and 114 are arranged to axially retain wedge segment 106 relative to race 102, and side plate 108 is arranged to axially retain race 104 relative to wedge segment 106.

In an example embodiment, side plate 108 is formed from plastic and the protrusion 126 is snap-fit into aperture 124. Protrusion 126 includes bent tab 144 with portion 146 forming planar surface 148 parallel to annular surface 134. Wedge segment 106 is axially retained between surface 134 and planar surface 148. Protrusion 126 includes portion 150 extending axially from annular surface 134 to portion 148. Wedge segment 106 includes width 152 and planar surface 148 is axially offset from annular surface 134 by distance 154, greater than width 152. Aperture 124 is larger than protrusion 126 such that wedge segment 106 is partially displaceable relative to side plate 108 in a circumferential direction.

In the example embodiment shown, unitized wedge clutch 100 includes a plurality of wedge segments 106. Side plate 108 includes a plurality of protrusions 126. Each wedge segment includes an aperture 124. Each aperture has a respective one of the plurality of protrusions passing therethrough. As shown, race 102 is a radially outer race and race 104 is a radially inner race, although other configurations of races 102 and 104 are possible. For example, race 104 may be an outer race and race 102 may be an inner race. Similarly, race 102 is shown with serrated outer surface 156 for press-fitting, but other configurations including splines, or riveted or welded connections, for example, are possible to connect each of race 102 and 104 to other components.

Figure 4:
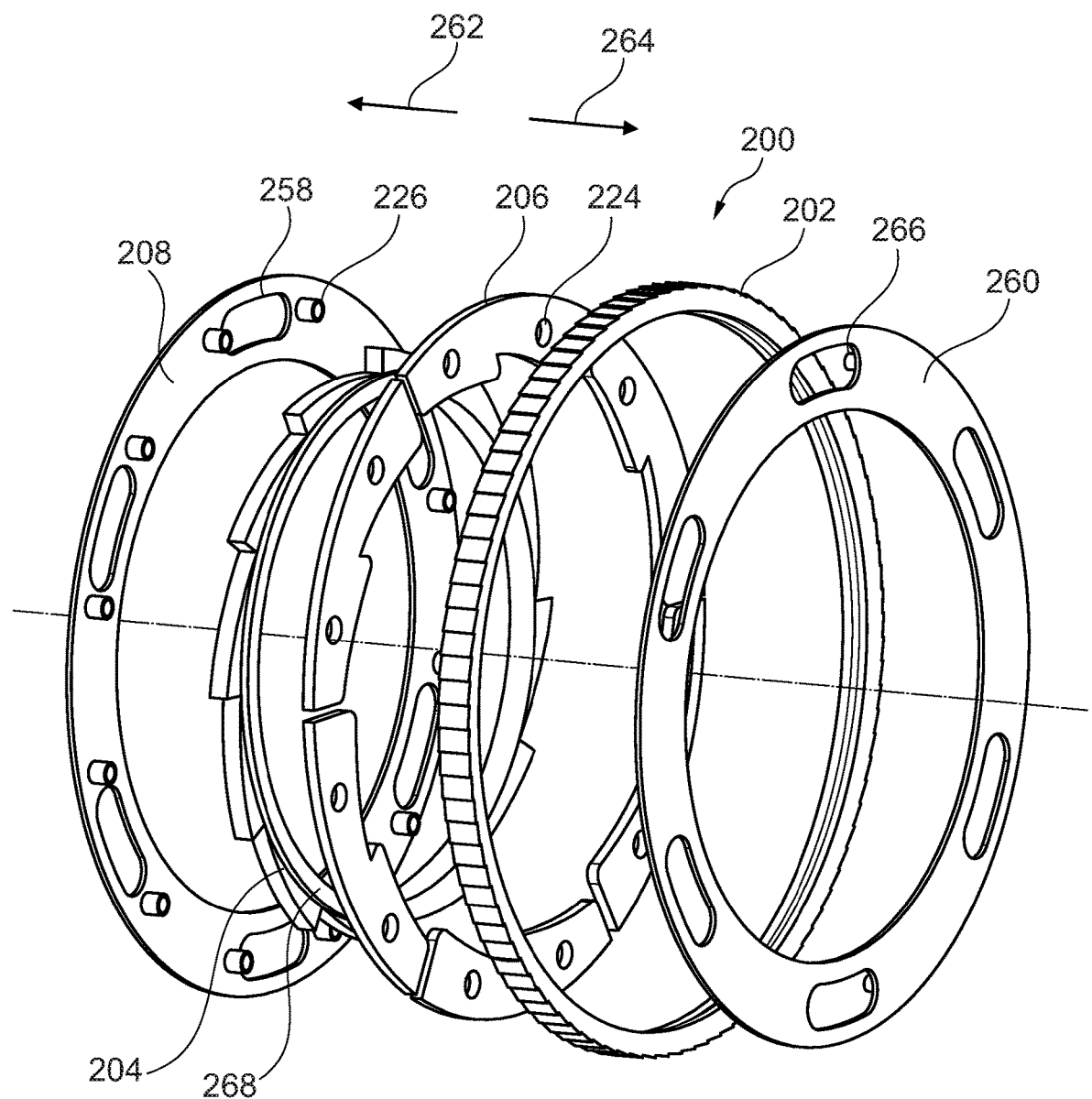
FIG. 4 illustrates a perspective exploded view of a unitized wedge clutch according to an example aspect of the present disclosure.
Figure 5:
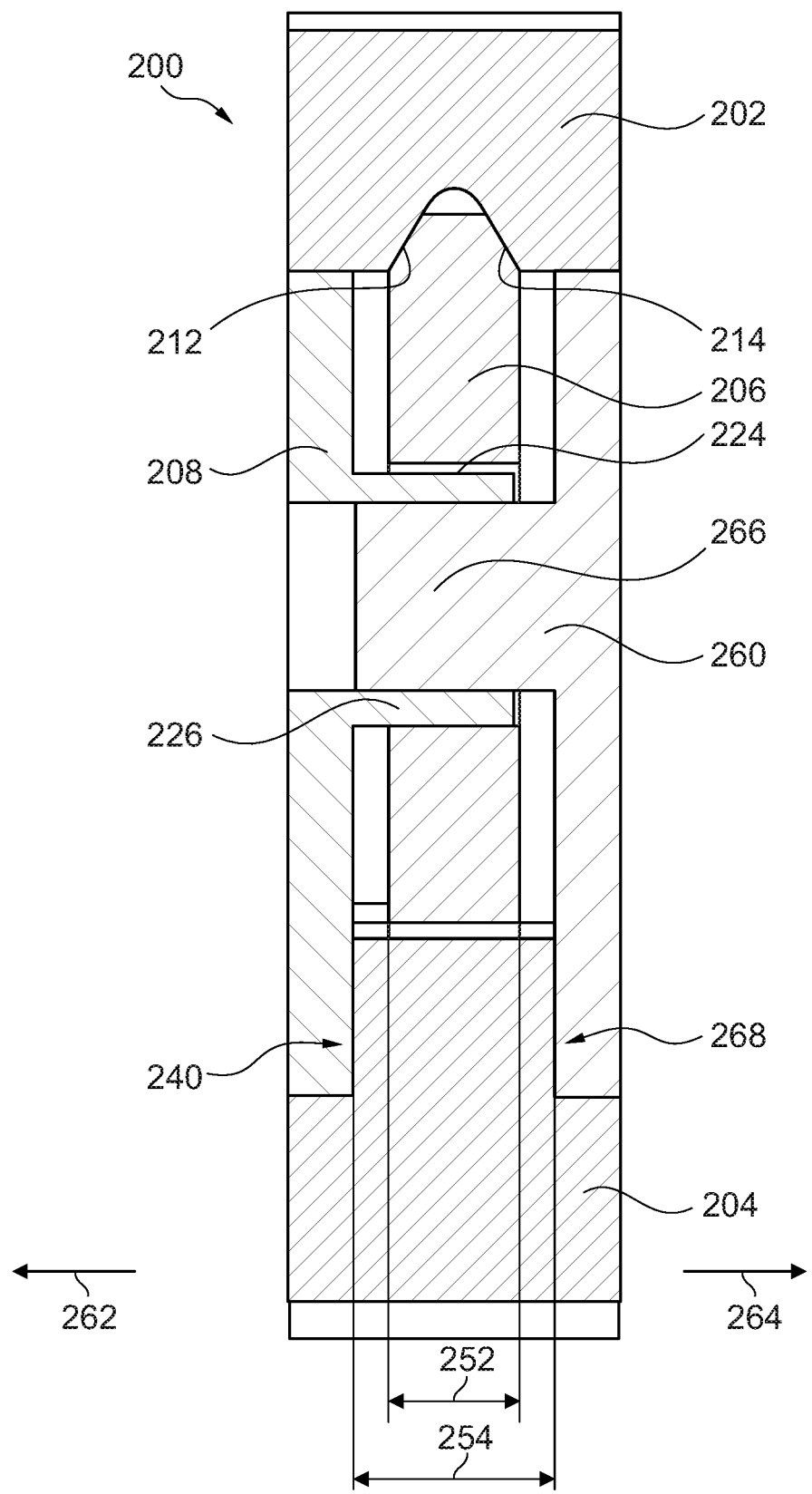
FIG. 5 illustrates a cross-sectional view of the unitized wedge clutch of FIG. 4.

The following description is made with reference to FIGS. 4-5. FIG. 4 illustrates a perspective exploded view of unitized wedge clutch 200 according to an example aspect of the present disclosure. FIG. 5 illustrates a cross-sectional view of the unitized wedge clutch of FIG. 4. The previous description of unitized wedge clutch 100 applies to wedge clutch 200 except as described below. All 2XX reference numerals correspond to 1XX reference numerals in the above description. Unitized wedge clutch 200 includes first side plate 208 with aperture 258 circumferentially offset from protrusion 226. Although aperture 258 is shown with a kidney shape, other shapes of aperture 258 are possible. Aperture 258 may be a round hole, a rectangle, a slot, or any other shape that would allow a lubricating oil flow through unitized wedge clutch 200, for example.

Unitized wedge clutch 200 includes second side plate 260. Side plate 208 is disposed on axial side 262 of the wedge segment and side plate 260 is disposed on axial side 264 of the wedge segment, opposite axial side 262. Protrusion 226 is connected to side plate 260 to fix side plate 208 to side plate 260. Wedge segment 206 includes width 252 and side plates 208 and 260 are disposed axially apart by distance 254, greater than width 252. Side plate 260 includes protrusion 266 installed inside of protrusion 226, which is at least partially hollow, to connect protrusion 226 to side plate 260. Aperture 224 is larger than protrusion 226 such that the wedge segment is partially displaceable relative to the side plates in a circumferential direction. Race 204 includes circumferential recess 240 and circumferential recess 268. Side plate 208 is installed in circumferential recess 240 and side plate 260 is installed in circumferential recess 268. Angled surfaces 212 and 214 are arranged to axially retain the wedge segment relative to race 202 and side plates 208 and 260 are arranged to axially retain race 204 relative to the wedge segment.

Unitized wedge clutches 100 and 200 are arranged to lock when race 102 (202) is rotated relative to 104 (204) in a first circumferential direction, and freewheel when the races are rotated relative to one another in a second circumferential direction, as is known in the art. Other embodiments (not shown) may include unitized wedge clutches that are adjusted to lock in both circumferential directions or freewheel in both directions. The configuration of unitized wedge clutches 100 and 200 improves assembly of the clutches in their intended application because the various components are installed as a unitized assembly or a single unit, instead of installing each race, segment, etc. separately.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMERALS

100 Unitized wedge clutch
101 Central axis
102 Race
104 Race
106 Wedge
108 Side plate
110 Circumferential groove
112 Angled surface
114 Angled surface
116 Ramp surface
118 Angled surface
120 Angled surface
122 Ramp surface
124 Aperture
126 Protrusion
128 Annular surface
130 Annular surface
132 Distance
134 Annular surface
136 Annular surface
138 Distance
140 Circumferential recess
142 Staked portion
144 Bent tab
146 Portion
148 Planar surface
150 Portion
152 Width
154 Distance
156 Serrated outer surface
200 Unitized wedge clutch
202 Race
204 Race
206 Wedge segment
208 Side plate
212 Angled surface
214 Angled surface
224 Aperture
226 Protrusion
240 Circumferential recess
252 Width
254 Distance
258 Aperture
260 Side plate
262 Axial side
264 Axial side
266 Protrusion
268 Circumferential recess

What is claimed is:

1. A unitized wedge clutch comprising:
a first race defining a circumferential groove with a first angled surface and a second angled surface;
a second race having a first ramp surface extending radially outward in a circumferential direction;
a wedge segment arranged in a radial space between the first race and the second race, the wedge segment having
a third angled surface aligned with the first angled surface,
a fourth angled surface aligned with the second angled surface,
a second ramp surface aligned with the first ramp surface, and
a first aperture; and
a first side plate having a first protrusion extending through the first aperture wherein the first aperture is larger than the first protrusion such that the wedge segment is partially displaceable relative to the first side plate in the circumferential direction; and wherein:
the first side plate has a seventh annular surface;
the first protrusion includes a bent tab with a first portion forming a planar surface parallel to the seventh annular surface; and
the wedge segment is axially retained between the seventh annular surface and the planar surface.

2. The unitized wedge clutch of claim 1 further comprising a plurality of wedge segments arranged circumferentially in the radial space between the first race and the second race.

3. The unitized wedge clutch of claim 1 wherein:
the second race has a third annular surface and a fourth annular surface axially offset from the third annular surface by a first distance;
the first side plate has a fifth annular surface axially aligned with the third annular surface, and a sixth annular surface axially offset from the fifth annular surface by a second distance less than the first distance; and the second race has a staked portion extending from the fourth annular surface to cover at least a portion of the sixth annular surface.

4. The unitized wedge clutch of claim 3 wherein:
the first angled surface and the second angled surface are arranged to axially retain the wedge segment relative to the first race; and
the first side plate is arranged to axially retain the second race relative to the wedge segment.

5. The unitized wedge clutch of claim 1 wherein:
the second race defines a circumferential recess with a first depth; and
the first side plate has a first width less than the first depth.

6. The unitized wedge clutch of claim 1 wherein:
the wedge segment has a width; and
the planar surface is axially offset from the seventh annular surface by a third distance greater than the width.

7. The unitized wedge clutch of claim 1 further comprising a plurality of wedge segments, wherein:
the first side plate has a plurality of first protrusions;
each of the plurality of wedge segments has an aperture; and
each aperture has a respective one of the plurality of first protrusions passing therethrough.

8. The unitized wedge clutch of claim 1 wherein the first race is a radially outer race and the second race is a radially inner race.

9. The unitized wedge clutch of claim 1 wherein the first side plate has a second aperture circumferentially offset from the first protrusion.

10. The unitized wedge clutch of claim 1 further comprising a second side plate, wherein:
the first side plate is disposed on a first axial side of the wedge segment;
the second side plate is disposed on a second axial side of the wedge segment, opposite the first axial side; and
the first protrusion is connected to the second side plate to fix the first side plate to the second side plate.

11. The unitized wedge clutch of claim 10 wherein:
the wedge segment has a width;
the first side plate and the second side plate are disposed axially apart by a fourth distance greater than the width.

12. The unitized wedge clutch of claim 11 wherein:
the second side plate has a second protrusion;
the second protrusion is installed inside of the first protrusion to connect the first protrusion to the second side plate; and
the first aperture is larger than the first protrusion such that the wedge segment is partially displaceable relative to the first side plate and the second side plate in a circumferential direction.

13. The unitized wedge clutch of claim 10 wherein:
the second race has a first circumferential recess and a second circumferential recess;
the first side plate is installed in the first circumferential recess;
the second side plate is installed in the second circumferential recess;
the first angled surface and the second angled surface are arranged to axially retain the wedge segment relative to the first race; and
the first side plate and the second side plate are arranged to axially retain the second race relative to the wedge segment.

14. A unitized wedge clutch comprising:
a first race defining a circumferential groove with a first angled surface and a second angled surface;
a second race having a first ramp surface extending radially outward in a circumferential direction;
a wedge segment arranged in a radial space between the first race and the second race, the wedge segment having
a third angled surface aligned with the first angled surface,
a fourth angled surface aligned with the second angled surface,
a second ramp surface aligned with the first ramp surface, and
a first aperture; and
a first side plate having a first protrusion extending through the first aperture wherein the first side plate is formed from plastic and the first protrusion is snap-fit into the first aperture.

15. A method of assembling a unitized wedge clutch comprising:
positioning a plurality of wedge segments relative to a first race such that angled surfaces of the wedge segment engage a groove in the first race to axially retain the wedge segments relative to the first race;
inserting a first side plate such that protrusions of the side plate extend through respective apertures of each of the wedge segments;
attaching a second race to the first side plate such that ramped surfaces of the second race align with respective ramped surfaces of the wedge segments; and
staking the first side plate to the second race.

16. The method of claim 15 wherein the protrusions snap fit into the respective apertures axially retaining the wedge segments relative to the first side plate.

17. The method of claim 15 further comprising:
positioning a second side plate on an opposite side of the wedge segments from the first side plate; and
attaching the second side plate to the protrusions of the first side plate.

* * * * *